United States Patent
Boutaghou

(10) Patent No.: US 7,149,047 B1
(45) Date of Patent: Dec. 12, 2006

(54) HEATING/COOLING BASED SYSTEM FOR OBTAINING A DISC DRIVE SERVO SIGNAL

(75) Inventor: Zine-Eddine Boutaghou, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 121 days.

(21) Appl. No.: 10/349,017

(22) Filed: Jan. 21, 2003

(51) Int. Cl.
G11B 5/596 (2006.01)

(52) U.S. Cl. .................................. 360/77.03

(58) Field of Classification Search ............. 360/77.03, 360/77.02, 77.07, 324, 324.11, 77.05, 78.14; 428/212, 65.6, 539.5; 204/192.26
See application file for complete search history.

(56) References Cited

U.S. PATENT DOCUMENTS

| | | | |
|---|---|---|---|
| 5,518,804 A * | 5/1996 | Mizuno et al. | 428/212 |
| 5,568,331 A * | 10/1996 | Akagi et al. | 360/77.07 |
| 5,583,727 A * | 12/1996 | Parkin | 360/324 |
| 5,585,986 A * | 12/1996 | Parkin | 360/324 |
| 5,621,583 A | 4/1997 | Parks et al. | |
| 5,723,198 A | 3/1998 | Hosoe et al. | |
| 5,780,164 A * | 7/1998 | Pyzik et al. | 428/539.5 |
| 5,820,965 A * | 10/1998 | Pyzik et al. | 428/65.6 |
| 5,999,360 A * | 12/1999 | Meyer et al. | 360/77.02 |
| 6,033,538 A * | 3/2000 | Suwabe et al. | 204/192.26 |
| 6,055,139 A | 4/2000 | Ohtsuka et al. | |
| 6,178,073 B1 * | 1/2001 | Hayashi | 360/324.11 |
| 6,264,848 B1 | 7/2001 | Belser et al. | |

* cited by examiner

Primary Examiner—Fred F. Tzeng

(57) ABSTRACT

A data storage medium such as a disc for a disc drive having a data signal layer configured for providing a data signal and a servo signal layer that includes first material a second materials having thermal characteristics that are distinct from one another. The first material and second material define at least one signal feature for providing a modulating servo signal based upon the variation of thermal properties in the servo signal layer.

The first material may define spaced features of a servo pattern such as grooves and pits and the second material may fill the grooves and pits or other features. The intersection of the first and second material may provide a distinct thermal transition so that when the medium, typically a disc, is rotated around an axis, the servo features generate a thermo signal having a frequency proportional to the spacing between the signal features and an amplitude that is a function of the thermal properties of the first material and the second material.

The modulating servo signal may be detected by a thermal sensor which may include a magneto resistive element. The thermal system may be configured so that a data element detects both a servo signal and a data signal. The output from the data element may be processed to isolate the servo signal and data signal. Alternatively, the data signal and thermally-detectable servo signal may be detected by separate elements.

24 Claims, 11 Drawing Sheets

212

HEATING/COOLING BASED SYSTEM FOR OBTAINING A DISC DRIVE SERVO SIGNAL

FIELD OF THE INVENTION

The present invention relates generally to data storage systems and more particularly to systems for providing servo information in a data storage system.

BACKGROUND OF THE INVENTION

Data storage on rotating media such as disc drives requires that position information—a servo signal—to be detectable by a sensor. The position information provided in the servo signal allows a head to be accurately positioned with respect to the data storage medium.

On traditional magnetic media, servo information is magnetically encoded on the media. Typically, the servo signal is recorded on the media in a servo-writing process that uses the same systems that write data to the media. The media is typically divided into concentric tracks and sectors. Increased track and sector density permits greater data storage. However, as the number of tracks and data sectors increase, the servo writing process becomes more time consuming.

Magneto-optical systems have also been proposed. With these systems, the servo sector information is written using optical lithographic systems on the surface of a master disc. A series of pits and grooves is formed in this surface, which is then replicated onto the surface of a metal mold. Plastic discs with accurate copies of this pattern may then be produced from the mold by an injection molding processes. Since the servo information is molded into the entire disc surface, writing of individual sector information on the disc is unnecessary. One downside of this system is that increased cost and complexity of the optics system.

In addition, the presence of servo pits and grooves in a media affects the ability of the head to fly uniformly over the recording surface. Variations in fly height can disrupt or distort the servo signal.

A system has been disclosed where servo pits and grooves are filled and the medium is polished to provide a uniform surface that does not disrupt flyability. Systems using this technique are disclosed in U.S. Pat. No. 6,264,848, which is incorporated herein by reference. This process effectively pre-writes the servo information on the disc: The top surface of the disc is divided into servo tracks and data sectors as in a traditional magnetic disc drive, but the servo-writing process is avoided because the servo pattern is fabricated into the disc. Like traditional magnetic disc drives that require servo-writing, this system uses a portion of the disc surface area for providing a servo pattern which reduces the area of the medium available for data storage.

Improved systems for providing servo information are needed.

SUMMARY OF THE INVENTION

A data storage medium such as a disc for a disc drive may include a data signal layer configured for providing a data signal and a servo signal layer. The servo signal layer may include a first material and a second material. The second material has thermal characteristics that are distinct from the first material. The first material and second material define at least one signal feature for providing a modulating servo signal. The servo signal may be generated based upon the variation of thermal properties in the servo signal layer.

The first material may for example define a feature such as a groove. The second material may extend through the groove to fill the groove. The first material and second material may define one or more signal features, such that the intersection of the first and second material provide a distinct thermal transition. When the medium, typically a disc, is rotated around an axis, the servo features may generate a thermal signal having a frequency proportional to the spacing between the signal features and an amplitude that is a function of the thermal properties of the first material and the second material. The modulating servo signal may be detectable by a thermal sensor which may include a magneto resistive element. The thermal sensor may also be configured to detect a data signal.

In another embodiment, a disc drive includes a disc for storing data. The disc has a magnetic layer and a substrate layer. The magnetic layer is configured for storing data and providing a data signal. The substrate layer includes a first material having a first set of thermal properties and a second material having thermal properties distinct from the properties of the first material. The first material and second may be arranged to provide a servo signal based upon the distinct thermal properties of the first and second material.

A head may also be provided for reading information from the disc. The head may include an element for detecting a servo signal from the variations in the thermal properties in the substrate layer. The element may for example be constructed of materials for providing effective heat transfer between the disc and the element. The element may for example be constructed from a material selected from the group consisting of nickel, nickel-cobalt, and silicon nitride. In one embodiment the element may be dedicated specifically to receiving the servo signal. In this embodiment, a second element such as a magneto resistive element may be provided for receiving a data signal by detecting data that is magnetically stored in the magnetic layer of the disc.

Alternatively, a single element such as a magneto resistive element may be used to detect both the servo signal and the data signal. In this embodiment, a high pass filter may be provided for processing the data signal and a low pass filter may be provided for processing the servo signal.

In another embodiment, a data storage medium includes a data signal layer for providing a data signal and a servo signal layer configured for providing a servo signal. The data signal may have a lower boundary, an upper boundary defining a top surface, and a thickness extending from the upper boundary to the lower boundary. The servo signal layer may have an upper boundary, a lower boundary, and a thickness extending from the upper boundary to the lower boundary. The servo signal layer upper boundary may be configured below the data signal lower boundary. The servo signal layer may thus be configured so that it does not occupy space on the data signal layer. As a result, in one embodiment, the data storage on the data signal layer may be generally continuous across the surface of the storage medium. In one embodiment, the upper boundary of the servo signal layer may be immediately adjacent the lower boundary of the data signal layer. Alternatively, an oxide layer may be provided between the upper boundary of the servo signal layer and the lower boundary of the data signal layer. The servo signal layer may include at least two materials having distinct thermal properties, the at least two materials defining features for providing a servo signal based upon the distinct thermal properties of the materials. At least one of the materials may include one or more grooves and at least one of the other materials may fill the grooves in the first material.

A method for fabricating a data storage medium includes fabricating a substrate from a first material comprising at least one servo pattern feature, depositing a second material on the substrate to produce a generally flat medium, polishing the generally flat medium so that the servo pattern feature provides a distinct transition between the first material and the second material, and depositing a magnetic layer on top of the generally flat medium for storing data. The step of depositing a second medium on the first medium may include a plating process. The method may include the additional step of depositing an oxide layer prior to depositing the second medium to provide a stopping layer during polishing. A protective overcoat may also be provided over the magnetic layer. The step of polishing the combined medium may include mechanical polishing and/or chemical etching. The first material may have a first set of thermal properties and the second material may have a second set of thermal properties distinct from the first set of thermal properties.

A method of obtaining a servo signal and a data signal from a data-storage disc may include the steps of providing a disc comprising a first layer having a servo pattern that is detectable with a thermally sensitive element and second layer having magnetically stored data, detecting the data and the servo pattern with an element that provides an output, processing the output with a high-pass filter to obtain a data signal, and processing the output with a low-pass filter to obtain a servo signal.

Another method of obtaining a servo signal and a data signal from a data-storage disc may include the steps of providing a disc comprising a first layer having a servo pattern that is detectable with a thermally sensitive element and second layer having magnetically stored data, reading the data with a data element that provides a data signal, and detecting the servo pattern with a thermal element that provides a servo signal.

DETAILED DESCRIPTION OF THE PREFERRED EMBODIMENT

Figure 1:
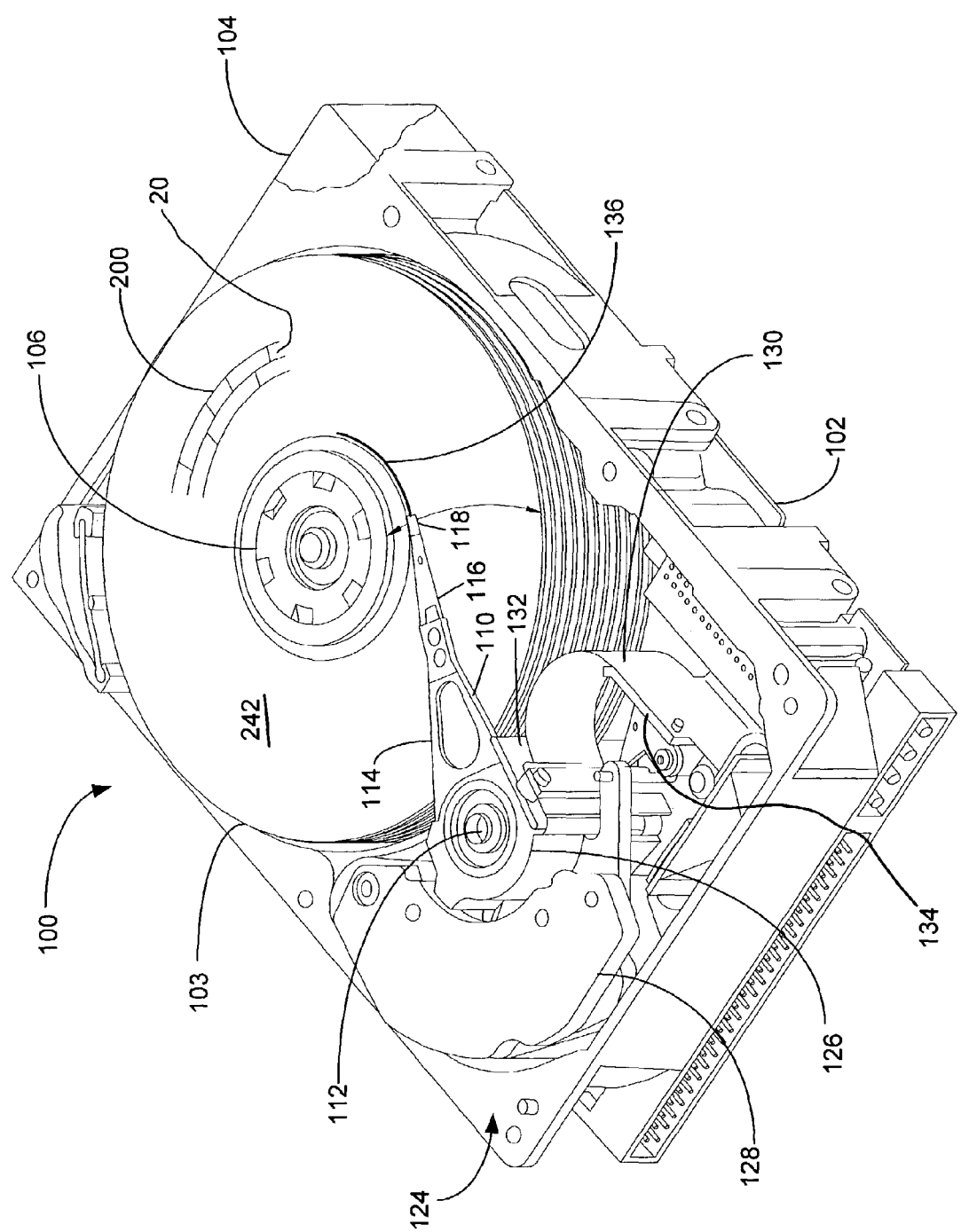
FIG. 1 is a perspective view of a disc drive.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108 to read from or write to tracks 136 on the disc.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

The information stored on the disc 108 is typically arranged in concentric tracks 200 which may be divided into sectors 202, as shown in FIG. 1. Although the tracks 200 and sectors 202 are illustrated in FIG. 1 for understanding of the present invention, they do not actually appear on the surface of the magnetic disc 108. While a disc drive 100 typically comprises multiple discs, 108 and multiple heads for the purposes of the following description, reference will be made to a singular disc and a singular head 118.

For reading and writing data, the head 118 may be locatable over particular tracks 200 and sectors 202 of the disc for reading data from particular sectors. This is typically accomplished by reference to a servo pattern 204 on the disc 108.

Figure 2:
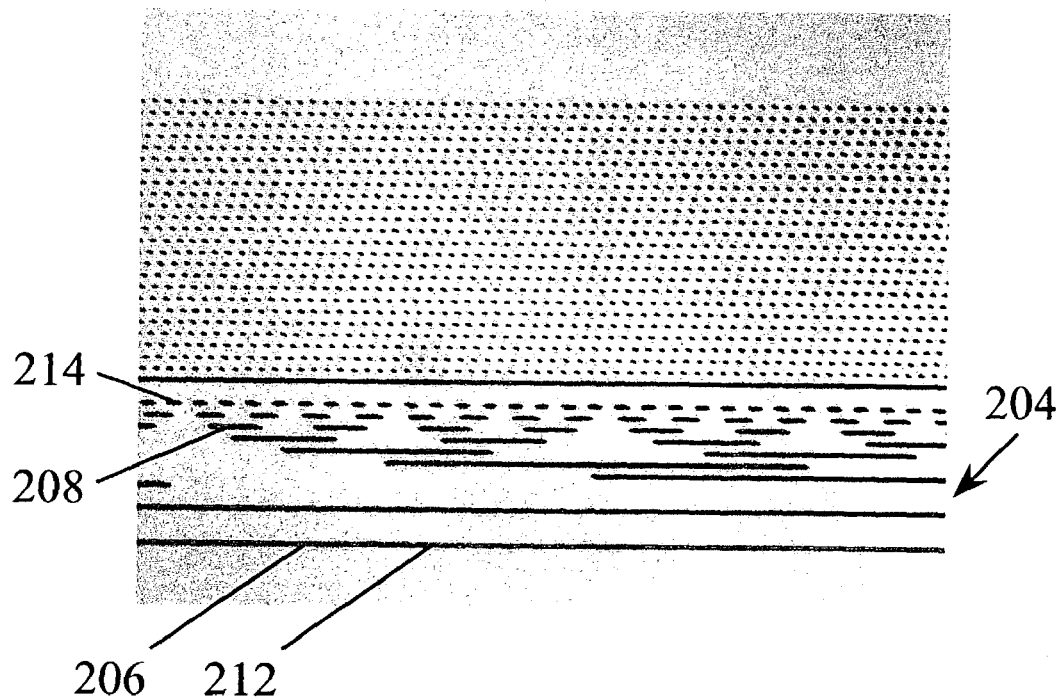
FIG. 2. is a top view showing servo tracks on a storage medium.

An enlarged view of an exemplary servo pattern 204 is provided in FIG. 2. By detecting the continuous lines 206 and/or dashed lines 208 of the pattern 204 shown in FIG. 2, the location of the head 118 relative to the servo pattern can be determined and positional adjustments may be made if the head is off track.

Figure 3:
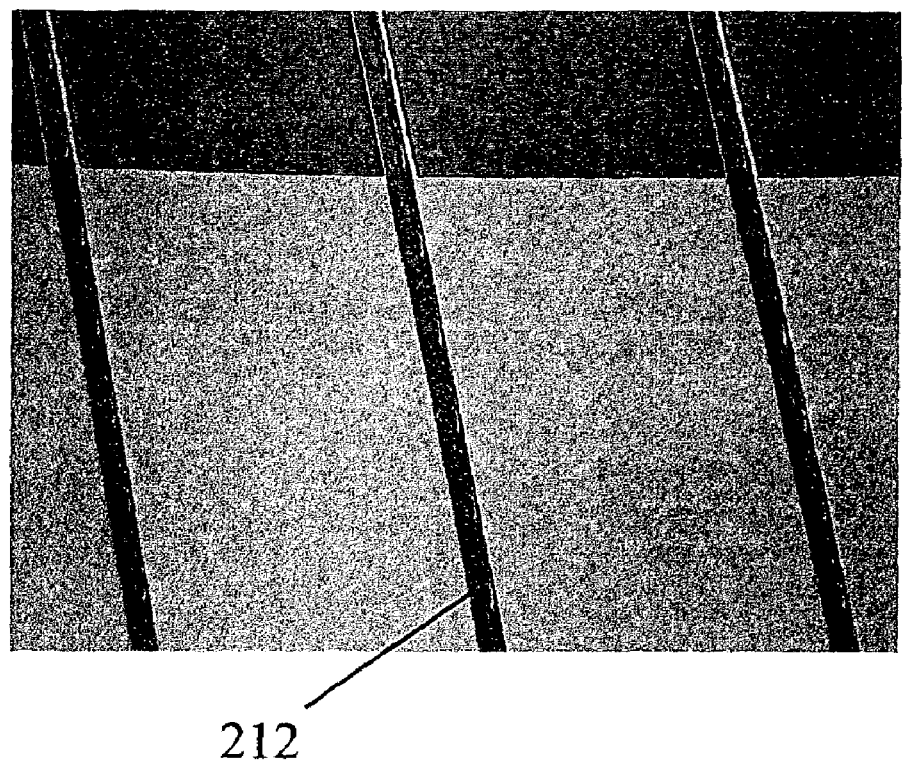
FIG. 3 is an enlarged view showing servo tracks on a storage medium.

While the servo pattern 204 has traditionally been written onto the disc 108 magnetically, the servo pattern may also be formed by fabricating servo features 210 such as grooves 212 and pits 214 into the disc 108 to form the servo pattern 204. In FIG. 2, grooves 212 are represented for example by the continuous lines 206 and pits 214 are represented for example by the short dashed lines 208. An enlarged plan view of grooves 212 (similar to but in a different configuration than the pattern of FIG. 2) is shown in FIG. 3. Prefabricating servo features 210 into the disc 108 may be desirable because it eliminates the need for a traditional magnetic servo writing process.

However, the presence of a grooved servo pattern 204 can present challenges with respect to tribology as well as flyability. In this context, tribology refers to the lubrication and wear of the disc 108 and/or the head 118. Flyability refers to the ability to maintain constant clearance between the head and the disc 108.

Figure 4:
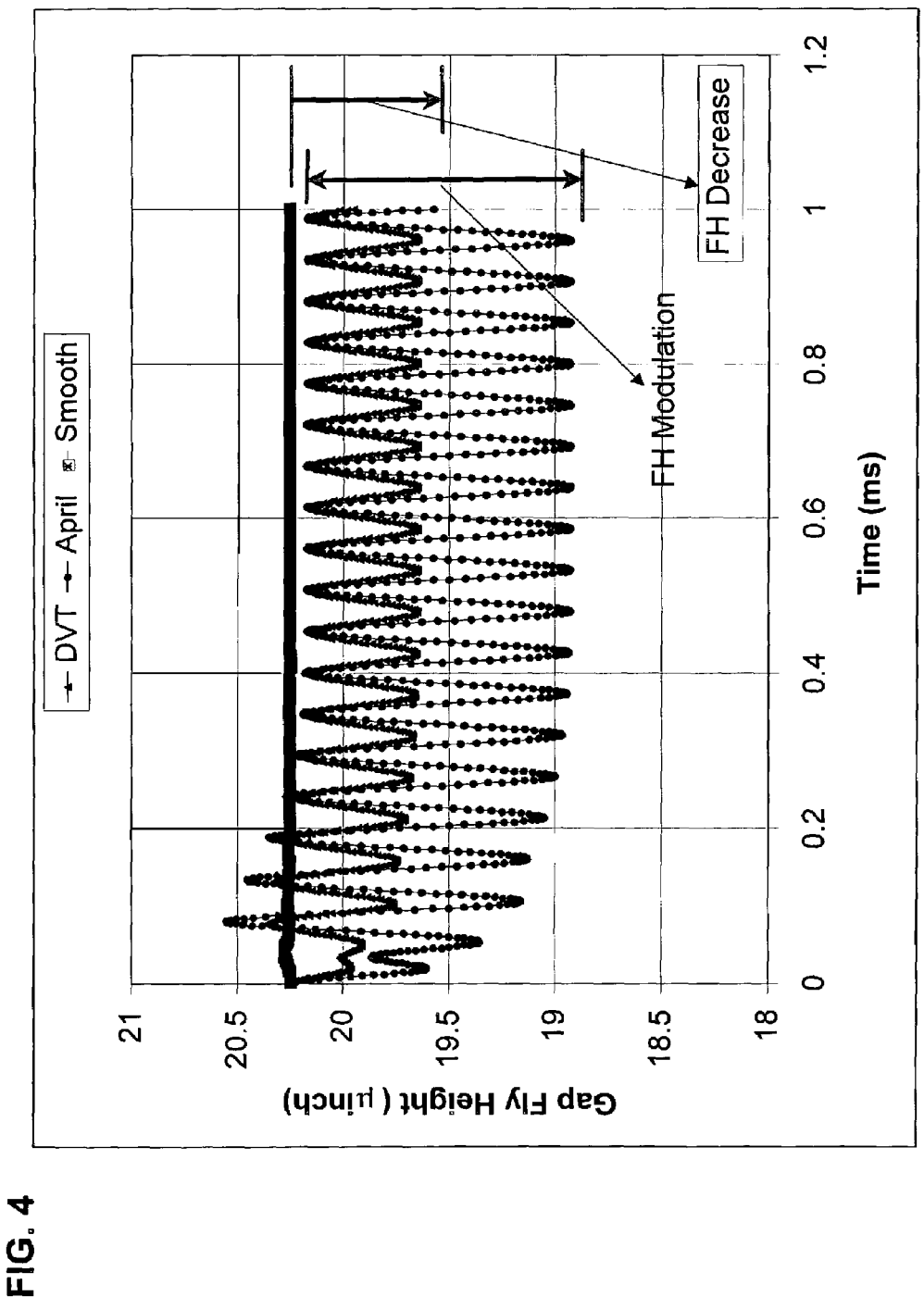
FIG. 4 is a graph depicting head fly height modulation caused by grooves in a storage medium.

As depicted in the graph of FIG. 4, the presence of grooves 212 and pits 214 can cause fly height modulation which can disrupt signal processing. In FIG. 4, the smooth line 216 represents the fly height of a head 118 over a smooth disc surface. Each modulating line 218, 220 on the graph represents the modulating fly height of a head 118 traveling over a grooved surface. A deeper servo pattern groove creates larger a fly height modulation 218, as depicted in FIG. 4 by the larger amplitude 222 of line 220 which corresponds to deeper groove and the smaller amplitude 224 of line 218 which corresponds to a 220 shallower groove.

To avoid excessive fly height modulation, a disc 108 may be formed with filled grooves 212 and pits 214 to provide a uniform top surface. Filling the grooves 212 and pits 214 presents the problem of detecting the servo pattern 204 in the disc. Prior art systems have proposed detecting filled grooves 212 and pits 214 using optical or magnetic technology. In these systems, the servo pattern 204 typically resides at the surface of the disc.

Figure 5:
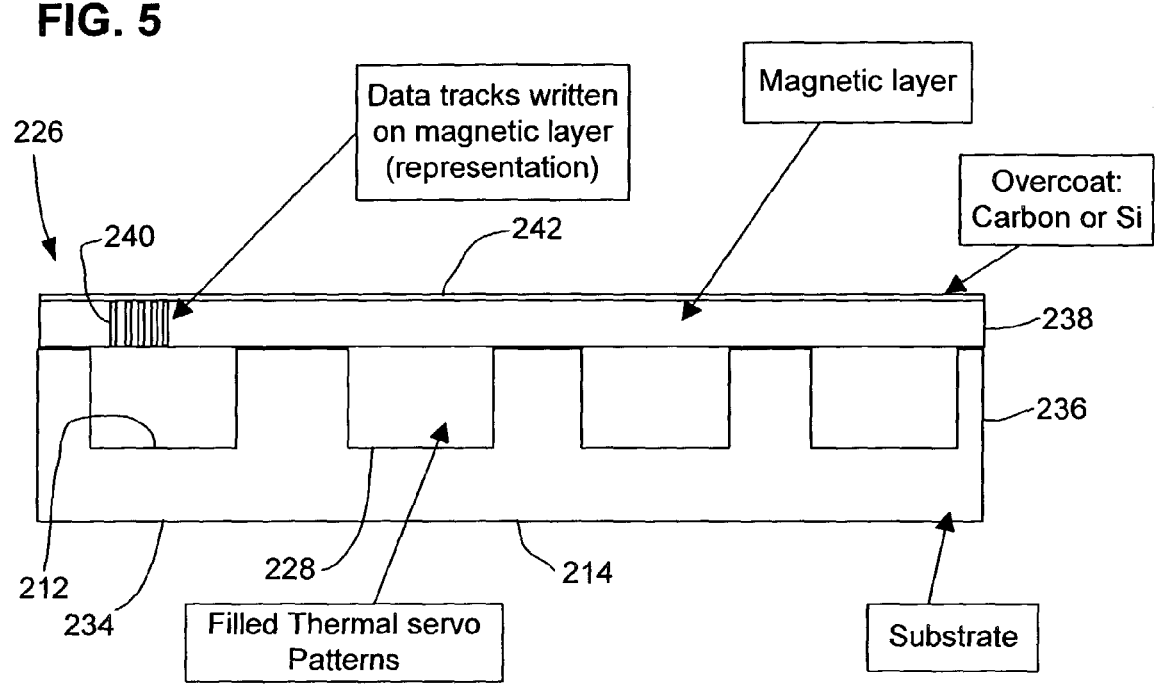
FIG. 5 is a cross-sectional view of one embodiment of a storage medium according to the present invention.

Referring now to FIG. 5, according to one embodiment of the present invention, a storage medium 226 is shown with servo features such as filled grooves 212 and/or pits 214. The grooves 212 or pits 214 filled with a filler material 228 that has thermal characteristics that are distinct from the thermal may be characteristics of the substrate that forms the disc 108. The grooves or other servo features form a servo pattern 204 that may be detected by a thermally sensitive device 230 such as a thermal element 232 It may be possible or desirable to use other features besides grooves and pits. To simplify the description of the system, reference will generally be made to grooves and pits.

The embodiment shown in FIG. 5 may be constructed for example by fabricating a disc 108 having a grooved and/or pitted servo pattern 204 and then filling the grooves 212 and pits 214 with a filler material 228. The filler material 228 and the material for fabricating the disc 108 are selected to have distinct thermal properties to allow for thermal detection of the servo pattern 204.

In one embodiment, the substrate 234 forming the disc and servo patters may for example be a polymer, in which case the filler material 228 may advantageously be a metal such as nickel or nickel-cobalt. The filler material 228 may also be silicon nitride, which has the advantage of compatibility with polymers. In another embodiment, the substrate 234 forming the disc 108 and servo patterns 204 may be a metal, in which case the filler material 228 may advantageously be a polymer. Other combinations having distinct thermal properties are also possible. Together, the substrate 234 and filler material 228 may form a substrate layer 236.

A magnetic layer 238 may be deposited on top of the substrate layer as shown in FIG. 5. Data tracks in the magnetic layer 238 are shown representatively in FIG. 5 but do not actually appear as depicted in the figure. The embodiment shown in FIG. 5 allows for a greater portion of the disc surface 242 to be used for data storage because the servo pattern 204 resides beneath the magnetic layer 238 rather than in the magnetic layer. In contrast, other systems have provided a single layer which includes both the servo pattern and data storage regions. In these other systems, the servo pattern takes up surface area that could otherwise be used to store data.

Figure 6:
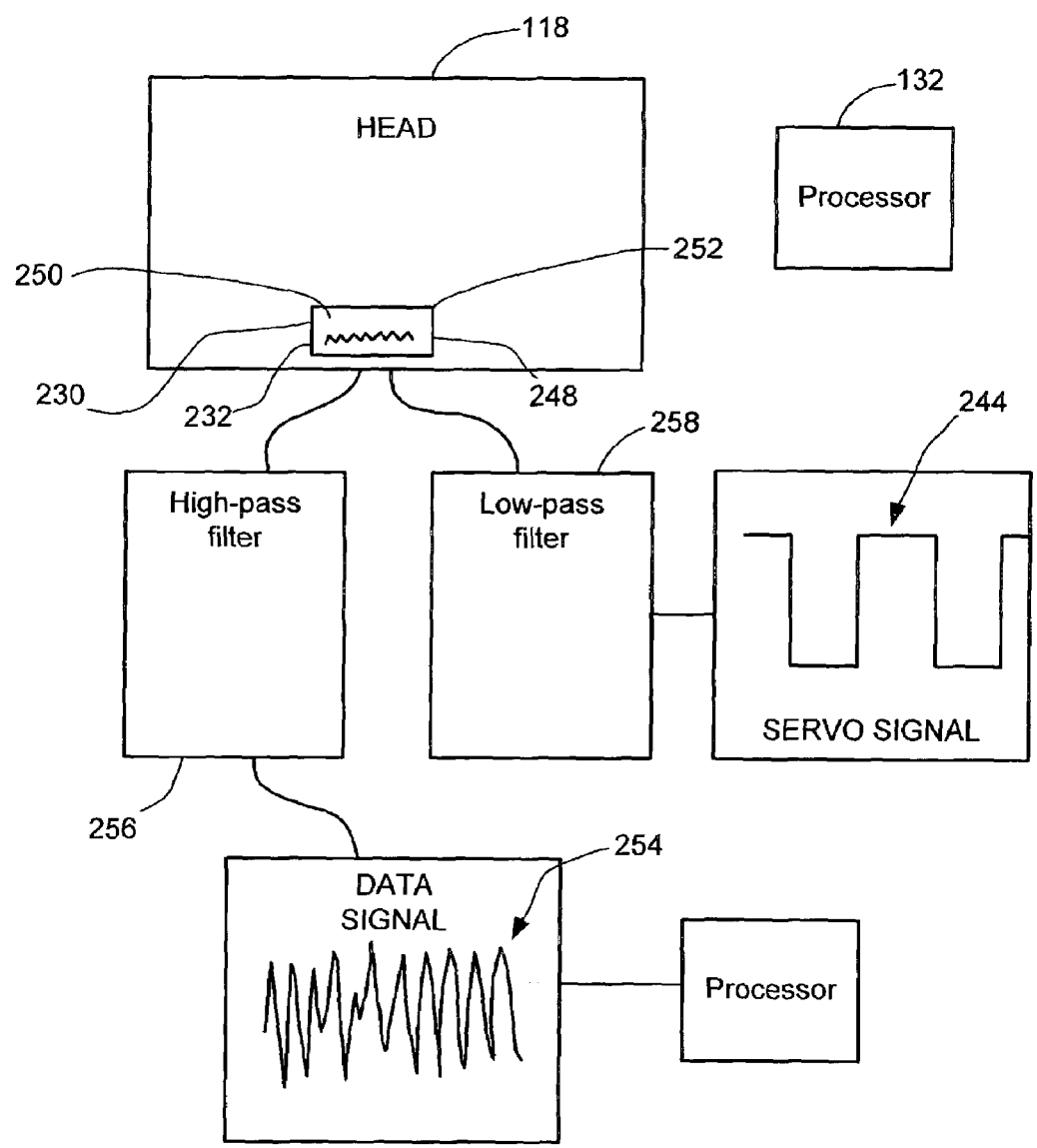
FIG. 6 is a schematic of a system for detecting a signal with an element and processing the signal to obtain a servo signal and a data signal.

At least two different techniques may be used for detecting a servo pattern of thermally distinct features 210 in a storage medium such as a disc 108. With reference to FIG. 6, in one embodiment, a servo signal 244 may be extracted from a data readback signal 246 because a magneto resistive element 248 used in a data head 118 is sensitive to variations in thermal characteristics as well as magnetic modulations.

As shown in FIG. 6, a head 118 typically includes a magneto resistive element (MRE) 248 that includes one or more giant magneto resistors (GMR) 250. Typically, a data element 252 includes a GMR stack—a plurality of GMR's. A GMR 250 changes resistance in response to a magnetic field and permits receipt of a data signal based on data magnetically encoded on a disc. The resistance of a GMR 250 is also responsive to thermal fluctuations.

Because of the dual sensitivity of the data element 252 to thermal and magnetic fluctuations, the readback signal output from the data element includes both a high-frequency data component 254 and a low-frequency servo component 244. The signal modulation of a GMR-based data element in response to thermal fluctuations is typically substantially smaller than the modulation in response to magnetic fluctuations, but the thermal (servo) component of the signal can nonetheless be distinguished over signal noise.

Figure 7:
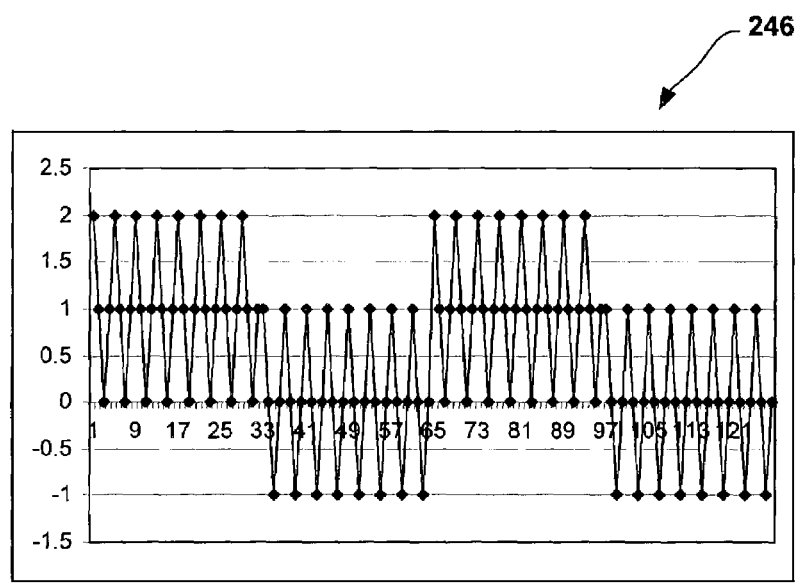
FIG. 7 is a graph showing a modulating readback signal from a head having a low frequency servo component and a high frequency data component.
Figure 8:
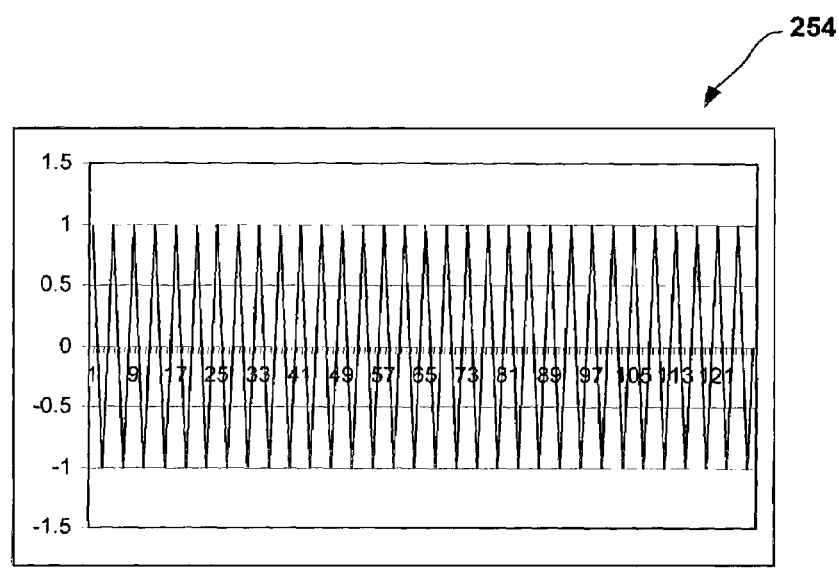
FIG. 8 is a graph showing a high frequency data component of a readback signal from a head.
Figure 9:
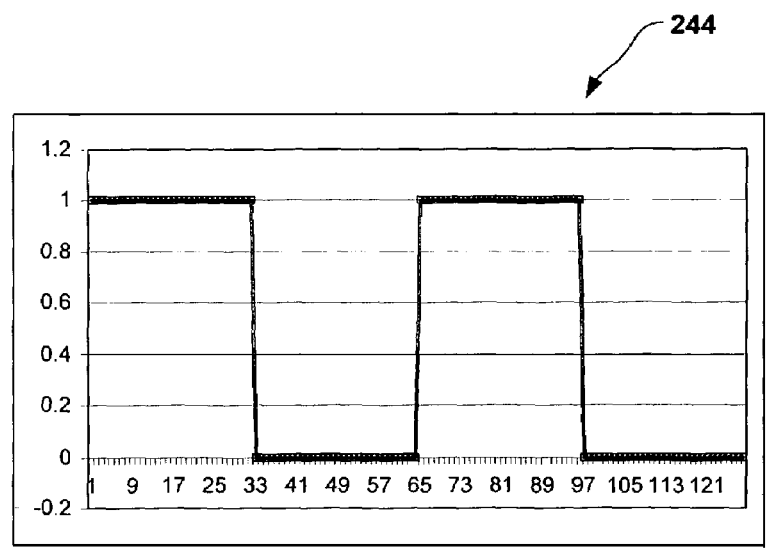
FIG. 9 is a graph showing a low frequency servo component of a readback signal from a head.

Referring now to FIG. 7, a graph is provided showing a readback signal 246 having both a higher-frequency data component and a lower-frequency servo component. For illustration purposes, the magnitude of the lower-frequency servo component 244 is exaggerated to clearly show the two signals. A high-pass filter 256, shown schematically in FIG. 6, may be used to isolate the data component 254 of the signal, which is represented in FIG. 8. A low-pass filter 258, also shown schematically in FIG. 6, may be used to isolate the servo component 244 of the signal, which is represented in FIG. 9. The servo signal may be fed to a processor 260 and/or a controller 132 for positioning the head 118.

In a second embodiment, instead of extracting the servo signal 244 from the output of the data element, a separate thermal element 264 may be provided for detecting the servo signal. While a data element 252 may be capable of detecting the servo signal 244, a data element is typically not optimized for detecting thermal modulations.

It may be desirable to incorporate into the head 118 a separate element 264 that is designed to provide greater thermal sensitivity than is typically provided by a data element 252. One factor in designing a thermal element is the selection of material which forms the element. The thermal element 264 could be, but is not necessarily, a magneto-resistive element. For example, the thermal element may advantageously be construction from Nickel, Nickel-Cobalt or another non-magnetic material with appropriate properties. Depending on the material selected, greater heat transfer between the media and the thermal element may be achieved with a separate thermal element than a conventional MRE data element.

Figure 10:
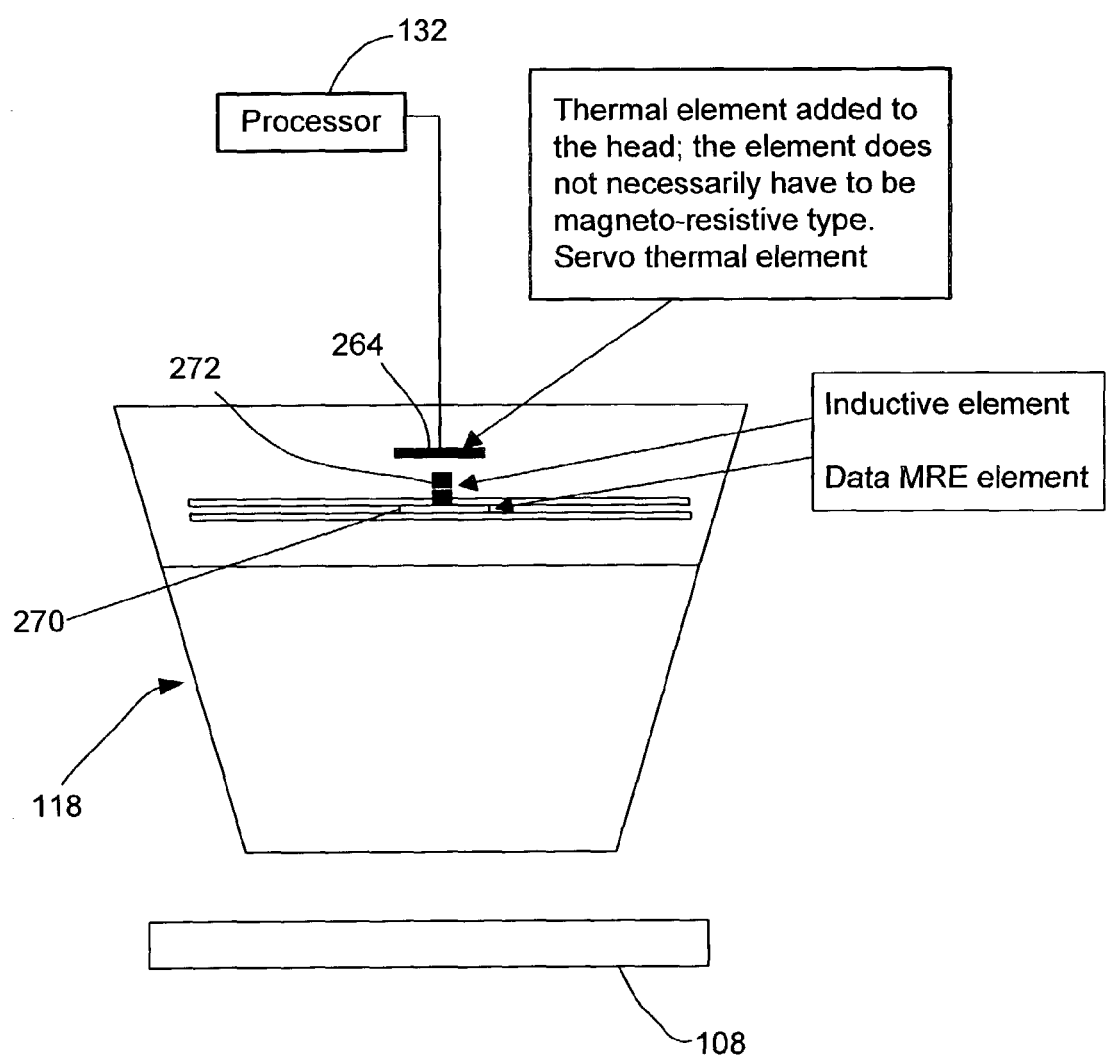
FIG. 10 is an illustration of a head having a magneto resistive element, a thermal element, and an inductive element according to one embodiment of the present invention.

Referring now to FIG. 10, a head 118 having a separate thermal element 264 is shown. The thermal element 264 may be coupled to a processor 132 for positioning the data head 118. Also shown in FIG. 10 are the data element 270 for reading magnetically recorded data and an inductive element 272 for writing data magnetically.

Figure 11:
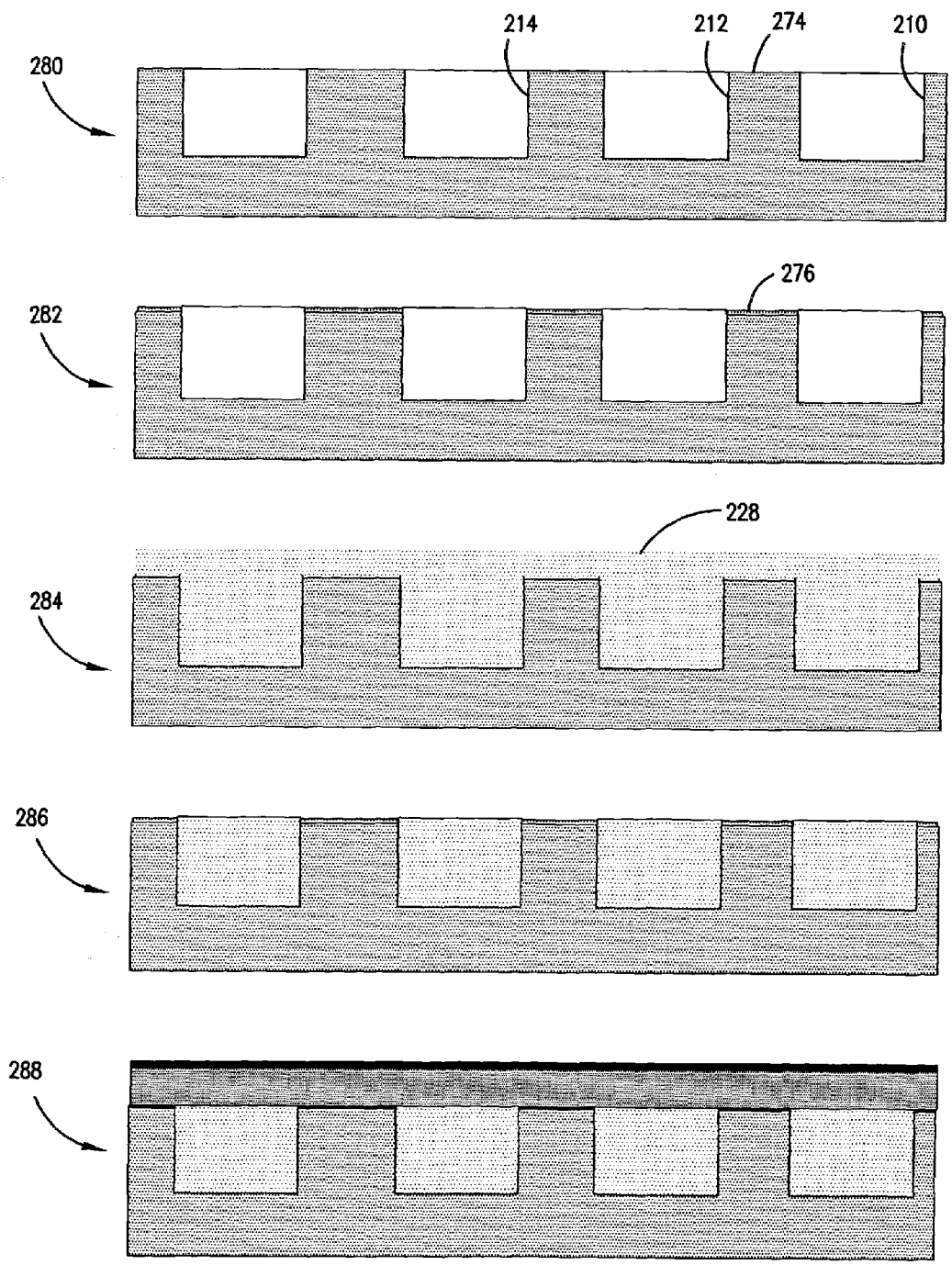
FIG. 11 depicts steps for fabricating an embodiment of storage medium.

FIG. 11 shows a process for fabricating a disc in accordance with the present invention. There may be other processes for producing a disc or other medium having a servo pattern with features that have distinct thermal properties.

In Step One 280, a disc substrate 274 is fabricated with servo pattern features 210 such as grooves 212 and pits 214. Fabrication of the disc substrate 274 may involve etching, stamping, molding, or other techniques.

In optional Step Two 282, a hard oxide layer 276 is deposited. The oxide layer 276 later stops the etching and/or polishing which is described below in Step Four.

In Step Three 284, a filler material 228 is added to the disc substrate 274. The filler material may be applied for example by a plating process or otherwise deposited on the disc to fill in grooves 212 and pits 214 or other servo pattern features 210. As shown in FIG. 11, excess filler material may be deposited so that the disc is covered with a layer of filler material.

In Step Four, 286 excess filler material 228 is removed through a chemical-mechanical polishing process so that the servo features provide distinct thermal transitions. If optional Step 2 282 has been completed, the polishing process will be complete when the oxide layer 270 is reached.

In Step Five 228, a magnetic layer 238 is deposited on top of the polished disc substrate 274 and protective overcoat 278 is deposited on top of the magnetic layer.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A data storage medium comprising:
   a data signal layer configured for providing a data signal; and
   a servo signal layer, distinct from the data signal layer, comprising a first material and a second material, the second material having thermal characteristics distinct from the first material, the first material and second material defining at least one signal feature for providing a modulating servo signal based upon variation of the thermal properties in the servo signal layer.

2. The data storage medium of claim 1 wherein the first material of the servo signal layer comprises portions defining a groove and the second material of the servo signal layer extends through the groove.

3. The data storage medium of claim 1 wherein the data storage medium comprises at least two signal features and wherein the medium is configured to provide a modulating servo signal when the medium is rotated around an axis, the servo signal having a frequency proportional to a spacing between the signal features.

4. The data storage medium of claim 1 wherein the data storage medium comprises at least two signal features and wherein the medium is configured to provide a modulating servo signal when the medium is rotated around an axis, the servo signal having an amplitude that is a function of the thermal properties of the first material and the second material.

5. The data storage medium of claim 1 wherein the medium comprises at least two signal features and wherein the medium is configured to provide a modulating servo signal when the medium is rotated around an axis, the modulating servo signal being detectable by a thermally responsive sensor.

6. The data storage medium of claim 5 wherein the thermally responsive sensor comprises a magneto resistive element.

7. The data storage medium of claim 6 wherein the magneto resistive element is also configured to detect a data signal.

8. A disc drive comprising:
   a disc for storing data, the disc comprising a magnetic layer for storing data and providing a data signal, and a substrate layer underlying the magnetic layer and comprising a first material having a first set of thermal properties and a second material having thermal properties distinct from the first material, the first material and second material being arranged to provide a servo signal based upon the distinct thermal properties of the first and second material;
   a head for reading information from the disc, the head comprising an element for detecting the variations in the thermal properties in the substrate layer for providing a servo signal.

9. The disc drive of claim 8 wherein the element is constructed of materials for providing effective heat transfer between the disc and the element.

10. The disc drive of claim 9 wherein the element of the head is constructed from a material selected from the group consisting of nickel, nickel-cobalt, and silicon nitride.

11. The disc drive of claim 8 wherein the element is dedicated to receiving the servo signal and wherein the disc drive further comprises a second element for receiving a data signal by detecting data that is magnetically stored in the magnetic layer.

12. The disc drive of claim 11 wherein the head comprises the second element and wherein the second element comprises a magneto resistive element.

13. The disc drive of claim 8 wherein the element is also configured to receive a data signal by detecting data that is magnetically stored in the magnetic layer.

14. The disc drive of claim 13 wherein the element comprises a magneto resistive element.

15. The disc drive of claim 14 further comprising a high pass filter for processing the data signal and a low pass filter for processing the servo signal.

16. A method for fabricating a data storage medium comprising:
   fabricating a substrate from a first material comprising a pattern of features defining a servo pattern;

depositing a second material on the substrate to produce a generally flat medium, the second material having thermal properties distinct from the thermal properties of the first material, polishing the generally flat medium to provide a distinct transition between the first material and the second material so that the features of the servo pattern are detectable by a thermally sensitive element; and depositing a magnetic layer on top of the generally flat medium for storing data.

17. The method of claim 16 further comprising the step of depositing an oxide layer prior to depositing the second medium to provide a stopping layer during the polishing step.

18. The method of claim 17 further comprising depositing a protective overcoat over the magnetic layer.

19. The method of claim 16 wherein the first material is a polymer and the second material is a metal.

20. The method of claim 16 wherein the step of depositing a second medium on the first medium comprises a plating process.

21. The method of claim 16 wherein the step of polishing the combined medium comprises mechanical polishing.

22. The method of claim 16 wherein the step of polishing the combined medium comprises chemical etching.

23. A method of obtaining a servo signal and a data signal from a data-storage disc comprising the steps of:

providing a disc comprising a first layer having a servo pattern that is detectable with a thermally sensitive element and second layer overlying the first layer and having magnetically stored data;

detecting the data and the servo pattern with an element that provides an output;

processing the output with a high-pass filter to obtain a data signal; and processing the output with a low-pass filter to obtain a servo signal.

24. A method of obtaining a servo signal and a data signal from a data-storage disc comprising the steps of:

providing a disc comprising a first layer having a servo pattern that is detectable with a thermally sensitive element and second layer overlying the first layer and having magnetically stored data;

reading the data with an data element that provides a data signal; and detecting the servo pattern with a thermal element that provides a servo signal.

* * * * *